United States Patent
Carter et al.

(10) Patent No.: US 11,611,639 B2
(45) Date of Patent: Mar. 21, 2023

(54) APPARATUS AND METHOD FOR AN ACCELERATED AND OFFLOAD DUAL BORDER RELAY

(71) Applicant: Charter Communications Operating, LLC, St. Louis, MO (US)

(72) Inventors: Thomas Nathan Carter, Colorado Springs, CO (US); Erez Jordan Gottlieb, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 210 days.

(21) Appl. No.: 16/986,437

(22) Filed: Aug. 6, 2020

(65) Prior Publication Data
US 2022/0046116 A1 Feb. 10, 2022

(51) Int. Cl.
| | | |
|---|---|---|
| H04L 69/16 | (2022.01) | |
| H04L 45/741 | (2022.01) | |
| H04L 61/251 | (2022.01) | |
| H04L 61/4511 | (2022.01) | |

(52) U.S. Cl.
CPC ............ H04L 69/16 (2013.01); H04L 45/741 (2013.01); H04L 61/251 (2013.01); H04L 61/4511 (2022.05)

(58) Field of Classification Search
CPC . H04L 45/741; H04L 47/125; H04L 61/1511; H04L 61/251; H04L 69/16
See application file for complete search history.

(56) References Cited

U.S. PATENT DOCUMENTS

2014/0226548 A1* 8/2014 Son .................. H04W 52/0222
                                                    370/311
2017/0208011 A1* 7/2017 Bosch ..................... H04L 45/64

FOREIGN PATENT DOCUMENTS

EP    3021532 A1 *  5/2016 ......... H04L 12/6418
EP    3537669 A1 *  9/2019 ............. H04L 45/00

* cited by examiner

Primary Examiner — Zhensheng Zhang
(74) Attorney, Agent, or Firm — Young Basile Hanlon & MacFarlane, P.C.

(57) ABSTRACT

Methods and systems for an accelerated and offload dual border relay. A method includes receiving, by a hardware border relay from a network device, an Internet Protocol (IP) packet, determining, by the hardware border relay, a packet type of the IP packet, translating, by the hardware border relay provisioned with IPv6 transition technology rules, the IP packet to a hardware translated IP packet when the IP packet is a first type, translating, by the offload border relay provisioned with MAP-T rules, the IP packet to an offload translated IP packet when the IP packet is a second type, transmitting, by the offload border relay to the hardware border relay, the offload translated IP packet when the IP packet is the second type, and transmitting, by the hardware border relay, one of the offload translated IP packet and the hardware translated IP packet to another network device.

20 Claims, 4 Drawing Sheets

APPARATUS AND METHOD FOR AN ACCELERATED AND OFFLOAD DUAL BORDER RELAY

TECHNICAL FIELD

This disclosure relates to network devices employed to transfer packets between Internet Protocol Version 4 (IPv4) and Internet Protocol Version 6 (IPv6) domains. More specifically, this disclosure relates to a dual component border relay including a hardware accelerator and an offload border relay.

BACKGROUND

Networking and internetworking communication protocols are relied upon to carry data through the networks. The Internet Protocol (IP) is the principal communications protocol in the Internet protocol suite for relaying and routing packets across the networks from a source to a destination. It describes the format of packets, the addressing scheme, and other specifications for network and computing devices to communicate over the network. Internet Protocol Version 4 (IPv4) is the fourth revision of the IP. IPv4 uses a 32-bit address scheme allowing for a total of $2^{32}$ IP addresses, where each IP address is a numerical label assigned to a device connected to the network. The IP address is a unique identifier for a device and each device needs its own IP address. The rapid development of the Internet has reached a point where most IPv4 addresses have already been distributed. This rapid growth of Internet data traffic is requiring service provider's to allocate more and more of their limited IPv4 IP address inventory to high speed data subscribers prior to completion of the service provider's migration to the expanded address space enabled with Internet Protocol Version 6 (IPv6), which is the sixth revision of the IP and uses a 128-bit address, theoretically allowing $2^{128}$ IP addresses.

IPv6 transition technology facilitates the transitioning of the Internet from the IPv4 infrastructure to the IPv6 networks since IPv4 and IPv6 are not directly interoperable. Mapping of Address and Port (MAP) is an IPv6 transition technology that allows IPv4 addresses to be translated (Mapping of Address and Port using translation (MAP-T)) or encapsulated (Mapping of Address and Port using encapsulation (MAP-E)) into IPv6 without the need for stateful translation on the service provider network. This enables service providers the ability to leverage IPv6 only networks to co-exist with IPv4-only devices on the subscriber's network in a manner that has minimal impact on the user experience.

Network devices such as expensive software-based border relays or border routers are provisioned with MAP-T rules to translate packets between the IPv4 and IPv6 domains. Faster, more efficient, and less expensive network devices are needed in view of the ever increasing Internet demand.

SUMMARY

Disclosed herein are methods and systems for Mapping of Address and Port using translation (MAP-T) accelerated and offload dual border relay.

In implementations, a method for performing dual border relay processing, the method includes receiving, by a hardware border relay from a network device, an Internet Protocol (IP) packet, determining, by the hardware border relay, a packet type of the IP packet, translating, by the hardware border relay provisioned with IPv6 transition technology rules, the IP packet to a hardware translated IP packet when the IP packet is a first packet type, translating, by the offload border relay provisioned with MAP-T rules, the IP packet to an offload translated IP packet when the IP packet is a second packet type, transmitting, by the offload border relay to the hardware border relay, the offload translated IP packet when the IP packet is the second packet type, and transmitting, by the hardware border relay, one of the offload translated IP packet and the hardware translated IP packet to another network device.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
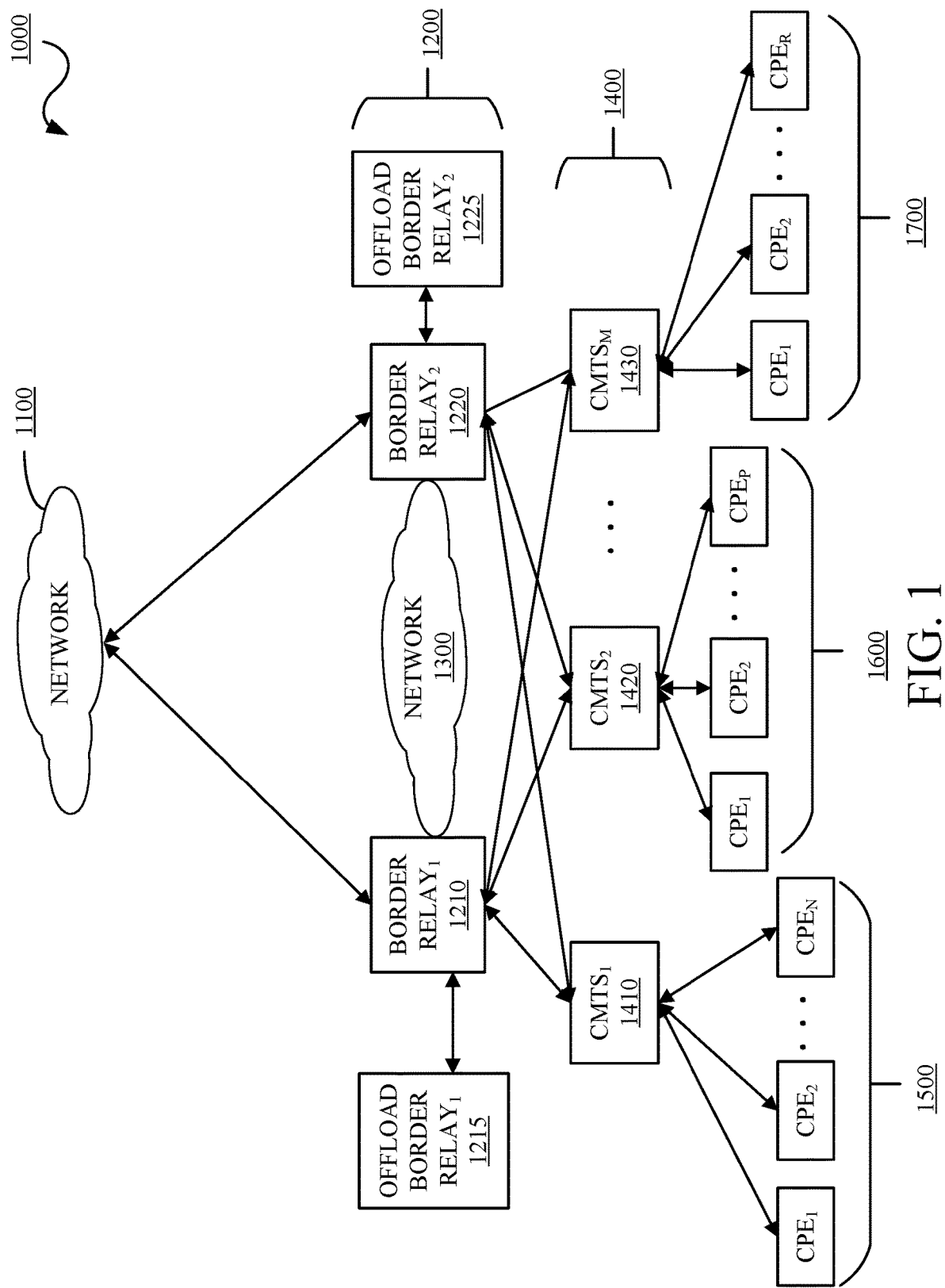
FIG. 1 is a diagram of an example network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, compositions and methods. Those of ordinary skill may thus recognize that other elements and/or steps may be desirable or necessary to implement the devices, systems, compositions and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

As noted, MAP is an IPv6 transition technology or network address translation technology that allows IPv4 addresses to be translated or encapsulated into IPv6 without the need for stateful translation on the service provider network. This enables service providers the ability to leverage IPv6 only networks to co-exist with IPv4-only devices on the subscriber's network in a manner that has minimal impact on the user experience. The IPv6 transition technologies can include, but are not limited, to MAP and LW4over6. The description herein refers to translation and encapsulation techniques for implementing the IPv6 transition technology. For purposes of discussion, the term "translation" is meant to capture or refer to both translation and encapsulation techniques except as otherwise differentiated or noted herein for the respective translation and encapsulation techniques. For purposes of discussion, MAP-T is used for illustration. Other translation and encapsulation techniques can be used without departing from the scope of the specification and claims.

MAP defines two modes of operation. The MAP-E mode uses encapsulation for transport of IPv4 traffic in an IPv6 header and follows encapsulation rules defined in RFC 2473. The MAP-T mode uses the stateless IP/ICMP translation algorithm (SIIT) to convert IPv4 headers into IPv6 headers and follows stateless translation rules defined in RFC 6145.

MAP-E and MAP-T offer distinct advantages over other co-existence technologies, such as NAT444/NAT44 or Dual-Stack Lite. The primary advantage is that translation or de-encapsulation at the Border Relay (BR) is accomplished through stateless mappings between the IPv4 address and the IPv6 prefix. The critical difference between the MAP methodology and traditional translation technologies, such as NAT44, is that MAP assigns a port range to the CPEs that share the same public IPv4 address. This allows the address and port range combination that is translated or encapsulated in the IPv6 header to be represented uniquely. In this way, IPv6 aggregation logic can be used to direct packets in a stateless fashion, rather than a relying upon per-subscriber or per-connection criteria to determine state.

MAP-T provides additional advantages by providing a more flexible topology for the MAP domain. Because traffic to and from the customer premise can be forwarded in IPv6 natively, traffic classification and routing optimization policies configured for the IPv6-only network can be easily enforced. MAP also provides a more scalable solution than the alternative technologies because factors such as port consumption and the number of stateful translations at the CGN are reduced or eliminated.

Described herein are methods and systems for an accelerated and offload dual border relay. In an implementation, a border relay is a dual border relay including a hardware border relay and an offload software border relay. The hardware border relay can review defined fields in an Internet Protocol (IP) packet for processing either by the hardware border relay or the offload software border relay. The majority of the IP packets can be processed by the hardware border relay. Exceptional IP packets, those that meet certain conditions, can be processed by the offload software border relay. Consequently, the dual border relay enhances processing throughput between the IPv4 and IPv6 domains. The methods described are applicable to IPv6 transition technologies including, but not limited, to MAP and LW4over6.

In an implementation, a dual border relay can include a hardware accelerator component and an offload software component. In implementations, the offload software component can service multiple hardware accelerator components. Consequently, the dual border relay enhances processing throughput between the IPv4 and IPv6 domains with cost savings as the hardware accelerator component are less costly than software-based border relays.

In implementations, the defined fields can include, but are not limited to, communication protocol format field, the More Fragments (MF) field, the Fragment offset field, and the IP options fields. The hardware border relay or hardware accelerator can review each of the fields to determine if the IP packet is not a transmission control protocol (TCP) packet, not a user datagram protocol (UDP) packet, requires fragmentation, requires forwarding of fragments, has IP options, or combinations thereof. If one or more of the fields meet these conditions, the hardware border relay directs the IP packet to the offload software border relay or offload software component for exceptional processing. Consequently, the dual border relay can process two packet types in a faster and cost effective manner.

Although the description herein is with respect to MAP-T rules, the scope of the specification and claims are applicable to IPv6 transition technologies including, but not limited, to MAP-E and LW4over6. The applicable network devices, such as the border relays, customer premise equipment and the like, can be provisioned with rules appropriate to the IPv6 transition technology.

FIG. 1 is a diagram of an example network 1000 in accordance with some embodiments of this disclosure. The network 1000 includes a network 1100, border relays 1200 including at least border relay$_1$ 1210, an offload border relay$_1$ 1215, border relay$_2$ 1220 and an offload border relay$_2$ 1225, network 1300, cable modem termination system (CMTS) 1400 including at least CMTS$_1$ 1410, CMTS$_2$ 1420, and CMTS$_3$ 1430, customer premise equipment (CPE) including CPE$_1$, CPE$_2$, CPE$_N$ 1500, CPE$_1$, CPE$_2$, . . . , CPE$_P$ 1600, and CPE$_1$, CPE$_2$, . . . , CPE$_R$ 1700. The network 1100, the border relays 1200, the network 1300, the CMTS 1400, the CPE$_1$, CPE$_2$, CPE$_N$ 1500, the CPE$_1$, CPE$_2$, . . . , CPE$_P$ 1600, and the CPE$_1$, CPE$_2$, . . . , CPE$_R$ 1700 can be connected to or be in communication with (collectively "connected to") each other, as appropriate and applicable, using wired and wireless techniques, systems, and devices, including but not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 1000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

The network 1100 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. In implementations, the network 3100 can be an IPv4 based network. In implementations, the network 1100 can be a combination of an IPv4 based network and an IPv6 based network, where packets coming out of the network 1100 and entering the network 1100 are IPv4 packets.

The border relays 1200 including at least the border relay$_1$ 1210, the offload border relay$_1$ 1215, the border relay$_2$ 1220 and the offload border relay$_2$ 1225 can be provisioned with MAP-T rules to translate and transfer packets from an IPv4 domain to an IPv6 domain and from the IPv6 domain to the IPv4 domain. The border relay$_1$ 1210 and the border relay$_2$ 1220 can be hardware relays or circuits configured as a MAP-T accelerator to process packets of a first type. The offload border relay$_1$ 1215 and the offload border relay$_2$ 1225 can be software implemented on a computing devices, servers, or the like to process packets of a second type. The border relay$_1$ 1210 and the border relay$_2$ 1220 can differentiate between the two types and route packets accordingly. In implementations, the second type of packets can require further or exceptional processing. In implementations, the second type of packets include packets which are not transmission control protocol (TCP) packets, are not user datagram protocol (UDP) packets, require fragmentation, require forwarding of fragments, have IP options, or combinations thereof. Although the description herein uses border relays, the scope of the specification and claims are applicable to network devices provisioned with MAP-T including, but not limited to, border relays, border routers, and like devices.

The network 1300 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. The network 1300 can be an IPv4 based network, IPv6 based network, other networks, or combinations thereof.

The CMTS 1410, 1430, and 1430 are typically located in a service provider's central office, headend, or hubsite and provides high speed data services, such as cable Internet or Voice over Internet Protocol, to service provider subscribers.

The CPEs 1500, 1600, and 1700, can be, but are not limited to, routers, network switches, gateways, set-top boxes, fixed mobile convergence products, home networking adapters and Internet access gateways that enable customers to access a service provider's services and distribute them in a residence, enterprise, office, or like infrastructure. In implementations, the CPEs 1500, 1600, and 1700 may be equipment located at a customer's premises and connected with a service provider's network and/or telecommunication equipment, including for example, CMTS 1410, 1420, 1430, respectively. In implementations, one or more of the CPEs 1500, 1600, and 1700 can be provisioned with MAP-T rules. The CPEs 3500, 3600, and 3700 can be referred to as customer edge (CE) devices.

As noted, MAP-T is an IPv6 transition technology that allows IPv4 addresses to be translated into IPv6 (and vice versa) without the need for stateful translation on the service provider network. This enables service providers the ability to leverage IPv6 only networks to co-exist with IPv4-only devices on the service provider's network in a manner that has minimal impact on the user experience. MAP-T uses a stateless IP/ICMP translation algorithm (SIIT) to convert IPv4 headers into IPv6 headers and follows stateless translation rules as defined in RFC 6145, for example.

MAP-T offers distinct advantages over other co-existence technologies, such as NAT444/NAT44 or Dual-Stack Lite. The primary advantage is that translation at border relays is accomplished through stateless mappings between the IPv4 address and the IPv6 prefix. A difference between the MAP methodology and traditional translation technologies, such as NAT44, is that MAP-T assigns a port range to the CPEs that share the same public IPv4 address. This allows the address and port range combination that is translated in the IPv6 header to be represented uniquely. In this way, IPv6 aggregation logic can be used to direct packets in a stateless fashion, rather than a relying upon per-subscriber or per-connection criteria to determine state. MAP-T provides additional advantages by providing a more flexible topology for the MAP domain. Because traffic to and from the customer premise can be forwarded in IPv6 natively, traffic classification and routing optimization policies configured for the IPv6-only network can be easily enforced.

A MAP-T domain can be defined as one or more border relay nodes that serve within an administrative boundary which may coincide with a geographical, regional or subscriber base of CMTS and/or CPE devices. CPE devices with MAP-T capabilities translate the IPv4 traffic that egresses the subscriber home network. Using defined and provisioned mapping rules, the border relay forwards this traffic to the IPv4 internet. Public IPv4 traffic destined for the customer network is translated in the same way at the border relay and is again converted to IPv4 at the ingress path of the CPE.

MAP domains are defined through a set of parameters that are shared between the border relay and the set of CMTS or CPE devices assigned to the domain. These parameters are configured on the border relay. For CPE devices, configurations may be established statically, via a downloaded configuration file, or through open encodings conveyed via DHCP. All nodes in the MAP-T domain share the following set of common parameters: IPv4 Prefix, IPv6 Prefix, default mapping rule (DMR) Prefix, embedded address (EA) Length, port set ID (PSID) Offset, and PSID Length. The IPv4 Prefix is a global IPv4 prefix which is the MAP source address for traffic towards the Internet. The IPv6 Prefix is the CPE IPv6 space which is used as the IPv6 space between the CPE and border relay. The DMR Prefix is the default mapping rule (DMR) for translating all outside IPv4 source addresses to the IPv6 MAP-T domain. The EA Length is a set of bits representing the mapping of IPv4 addresses and optionally the layer-4 ports for a given mapping rule. The PSID Offset provides the means to define the lowest port number that is assignable by a given mapping rule. This attribute also determines the number of sequential ports supported by any defined port set. The PSID Length is the number of MAP bits in an IPv4 MAP port. This defines the sharing ratio of a given MAP rule. This can also be determined by taking the EA length and subtracting the amount of host bits in the IPv4 rule prefix.

IPv4 to IPv6 packet conversion follow a general set of rules or actions. The IPv4 addresses will be converted into IPv6 based on the MAP algorithm. The source IPv4 addresses will use RFC 6052 encoding to embed the source IPv4 address within the DMR prefix. The destination IPv4 will be subject to a lookup against the MAP IPv4 prefixes to find the mapped IPv6 prefix associated with the IPv4 destination address. It will be embedded as described in RFC 7599, and the PSID bits will be placed as a suffix to the embedded address. The Version, Internet Header Length, and Internet Header checksum fields are ignored for the sake of conversion. The version will become IPv6 by default, while the Internet header checksum and Internet Header Length will be discarded because there is not a related IPv6 field. For the IPv4 Type of Service bits, these can be directly mapped to the IPv6 traffic class, if the network is using post-RFC 2474 DSCP mappings of these bits, rather than older Type of Service mappings. This allows for quality of service (QoS) treatment to be similar on both the IPv4 and IPv6 sides of translation. The IPv4 total length is used to fill the IPv6 payload length field after subtraction of the IPv4 header and any included IPv4 options. The IPv4 protocol and time-to-live (TTL) fields are directly copied to the IPv6 next header and hop limit fields. The IP Identification field, the Don't Fragment Field, the More Fragments field, and the Fragment offset fields are left black for translations that don't require fragmentation. If fragmentation or forwarding of a fragment stream is required, then the MAP-T rules for fragmenting and forwarding fragments are followed. Packets with IP options are either discarded or stripped of their IP options before translation. Protocol conversion (rather than header conversion) happens according to RFC 6145 Section 4.2, 4.3, 5.2, 5.3 for ICMP (protocol 1) to ICMPv6 (protocol 58).

Similarly, IPv6 to IPv4 packet conversion follow a general set of rules or actions. For IPv6 to IPv4 packets, the embedded IPv4 address information and Embedded Address bits always exists in the IPv6 packet. For the destination IPv6 side, this is de-embedding the IPv4 destination embedded in the IPv6 destination address. For the source IPv4 address and source IPv4 port, this can be drawn directly from the packet. Anti-spoofing needs to be performed to ensure the embedded IPv4 address is the correctly mapped IPv4 prefix to the source IPv6 prefix. The source port needs to be compared against the EA bits to ensure they are correct. This means anti-spoofing is applied for MAP packets. The IPv6 flow label will be discarded, as there is not a relevant IPv4 header field. The IPv4 version field will always be set to IPv4, and the Internet Header Length will always be 5, as IP options will not be included. IPv6 Next Header and IPv6 Hop Limit will be directly translated to IPv4 Protocol and TTL, respectively. IPv6 Traffic Class can be directly translated to IPv4 Type of Service, assuming both sides are using Differentiated Services Code Point (DSCP) markings. The IPv4 Total Length Field will be set to IPv6Payload Length+ 20 bytes for the IPv4 header. Protocol conversion (rather than header conversion) happens according to RFC 6145 Section 4.2, 4.3, 5.2, 5.3 for ICMPv6 (protocol 58) to ICMP (protocol 1). Fragmented IPv6 packets contain an IPv6 Fragment Header before the layer 4 header. The Fragment Offset, Identification, and More Fragments fields from the IPv6 Fragment Header are copied to the equivalent fields in the IPv4 header, and the next header field in the IPv6 Fragment Header is copied to the IPv4 protocol field, except for the ICMPv6 to ICMP case described above. If an ICMPv6 packet is fragmented, protocol conversion happens instead. With respect to the MAP-E and LW4Over6 encapsulation techniques, there is no protocol conversion as per RFC 2473.

In summary, IPv4 and IPv6 source and destination addresses are changed in accordance with the RFC 7599 specification whenever MAP translation happens. The source and destination MAC addresses are also rewritten as part of standard IPv4 or IPv6 routing post-translation, along with standard decrementing of the TTL or Hop Limit and rewrite of IPv4 header checksum.

Operationally, based on provisioned MAP-T rules operation on the CPEs and border relays, an IPv6 packet from a CPE, e.g., $CPE_1$, $CPE_2$, $CPE_N$ 1500, $CPE_1$, $CPE_2$, ..., $CPE_P$ 1600, and $CPE_1$, $CPE_2$, ..., $CPE_R$ 1700 is sent to an appropriate CMTS, e.g., $CMTS_1$ 1410, $CMTS_2$ 1420, and $CMTS_3$ 1430. The appropriate CMTS sends the IPv6 packet to a border relay, e.g., border relay$_1$ 1210 and border relay$_2$ 1220. The border relay performs an IPv6 to IPv4 translation in accordance with the provisioned MAP-T rules and sends the translated IPv6-IPv4 packet to the IPv4 based network 1100 if the packet is a first type of packet. The border relay sends the packet to the offload border relay, e.g., the offload border relay$_1$ 1215 or the offload border relay$_2$ 1225, if the packet is a second type of packet. The offload border relay performs an IPv6 to IPv4 translation in accordance with the provisioned MAP-T rules and sends the translated IPv6-IPv4 packet to the border relay, which in turn sends the translated IPv6-IPv4 packet to the IPv4 based network 1100. In implementations, an IPv4 to IPv6 translation can be done at the CPE if the CPE receives an IPv4 packet. In implementations, the IPv4 based network 3100 can be the source entity and the CPE can be the destination entity.

Figure 2:
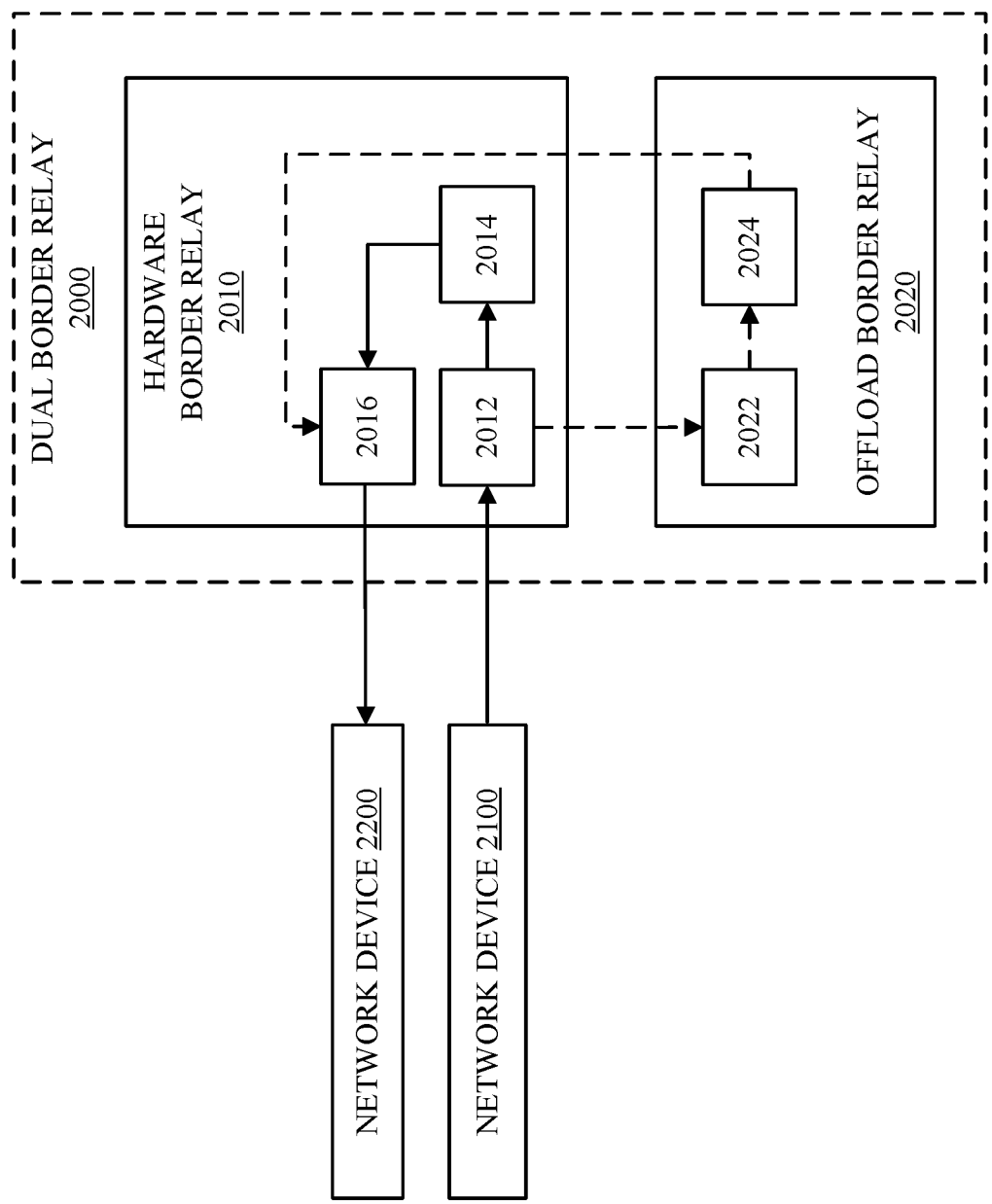
FIG. 2 is a diagram of an example accelerated and offload dual border relay in accordance with embodiments of this disclosure.

FIG. 2 is a diagram of an example dual border relay 2000 in communication with a network device 2100 and a network device 2200 in accordance with embodiments of this disclosure. The network device 2100 and the network device 2200 can be a router, gateway, or like device which can send and receive IPv4 and IPv6 packets.

The dual border relay 2000 can process two types of packets, fast packet types and slow packet types. The fast packet types can also be referred to as packets and the slow packet types can also be referred to as exceptional packets. Settings in a defined set of fields differentiate fast packets from slow packets. For translation techniques, the defined fields indicate a type of communications protocol, presence of IP Options, need for fragmentation, and/or whether packet is part of fragment stream. For example, the defined fields can include, but are not limited to, Total Length, Flags (where bit 1 indicates whether a datagram can be fragmented (0) or not (1) and bit 2 indicates to the receiving unit whether the fragment is the last one in the datagram (1) or if there are still more fragments to come (0)), Frag Offset, Protocol (where UDP uses the number 17, TCP uses 6, ICMP uses 1, IGRP uses 88 and OSPF uses 89), and IP Options (this field is for testing, debugging and security). Slow packets can include, but are not limited to, non-UDP and non-TCP packets, packets needing fragmentation due to size limitations, packets which are part of a fragment stream, and packets with IP Options set. For encapsulation techniques, the defined fields do not include the IP Options. For the encapsulation techniques, in the downstream direction, a packet can be designated as a fast packet type if the destination address can be determined from information in either the identifier field or "packet in error." In this instance, the encapsulation can be performed in the hardware border relay as described herein.

The dual border relay 2000 can include a hardware border relay 2010 and an offload border relay 2020. The hardware border relay 2010 can be a hardware acceleration circuit provisioned with MAP-T rules to process the fast packets. The hardware border relay 2010 can include an input determination circuit 2012, an IPv6 transition technology processing circuit such as a MAP-T processing circuit 2014, and an output circuit 2016. The offload border relay 2020 can be software or applications including MAP-T rules executing on a computing device, server, cloud, or the like to process the slow packets. The offload border relay 2020 can include an IPv6 transition technology processor such as a MAP-T processor 2022 and an output processor 2024. In implementations, the hardware border relay 2010 and the offload border relay 2020 can be individual and separate units which are connected. In implementations, the hardware border relay 2010 and the offload border relay 2020 can be co-located. In implementations, the hardware border relay 2010 and the offload border relay 2020 can be integrated. In implementations, the offload border relay 2020 can support multiple hardware border relays including the hardware border relay 2010. The dual border relay 2000 and the components therein may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Operationally, based on provisioned MAP-T rules operation on the dual border relay 2000, an IP packet, for example, can be received by the input determination circuit 2012 from the network device 2100. In implementations, the IP packet can be an IPv4 packet or an IPv6 packet. The input determination circuit 2012 can determine if the IP packet can be processed by the hardware border relay 2010 or by the offload border relay 2020. The input determination circuit 2012 can review, for example, fields related to communication protocol, fragment streams, whether fragmentation required or packet size, and IP Options as described herein. The input determination circuit 2012 can forward the IP packet to the MAP-T processing circuit 2014 if the received IP packet is a fast packet type. The MAP-T processing circuit 2014 can translate the IP packet pursuant to provisioned MAP-T rules. The MAP-T processing circuit 2014 can send the translated packet to the output circuit 2016 either by configuration or via routing. The output circuit 2016 can then send the translated packet to the network device 2200. In this fast packet pathway, destination address processing, hop count processing, time-to-live processing, checksum processing, and the like are handled in accordance with conventional techniques.

The input determination circuit 2012 can modify a destination MAC address of the packet and forward the packet to the MAP-T processor 2022 if the received packet is a second packet type. The MAP-T processor 2022 can translate the packet pursuant to provisioned MAP-T rules. The MAP-T processor 2022 can send the translated packet to the output processor 2024 either by configuration or via routing. In this slow packet pathway, hop count processing, time-to-live processing, and checksum processing is suspended and/or not performed when forwarding the packet from the hardware border relay 2010 to the offload border relay 2020. The output processor 2024 can replace a destination MAC address in the translated packet with a resolved destination MAC address. In implementations, the resolved MAC destination address can be provided by the input determination circuit 2012. The output processor 2024 can send the translated packet to the output circuit 2016 either by configuration or via routing and can handle the hop count processing, time-to-live processing, and checksum processing at this time in accordance with conventional techniques. The output circuit 2016 can then send the translated packet to the network device 2200. In this second packet pathway, destination MAC address processing is modified to transfer the packet from the hardware border relay 2010 to the offload border relay 2020, which in turn re-inserts the original destination MAC address. The hop count processing, time-to-live processing, and checksum processing are held in abeyance during input processing when MAP-T processing is done by the offload border relay 2020 and are handled during output processing by the offload border relay 2020 in accordance with conventional techniques.

Figure 3:
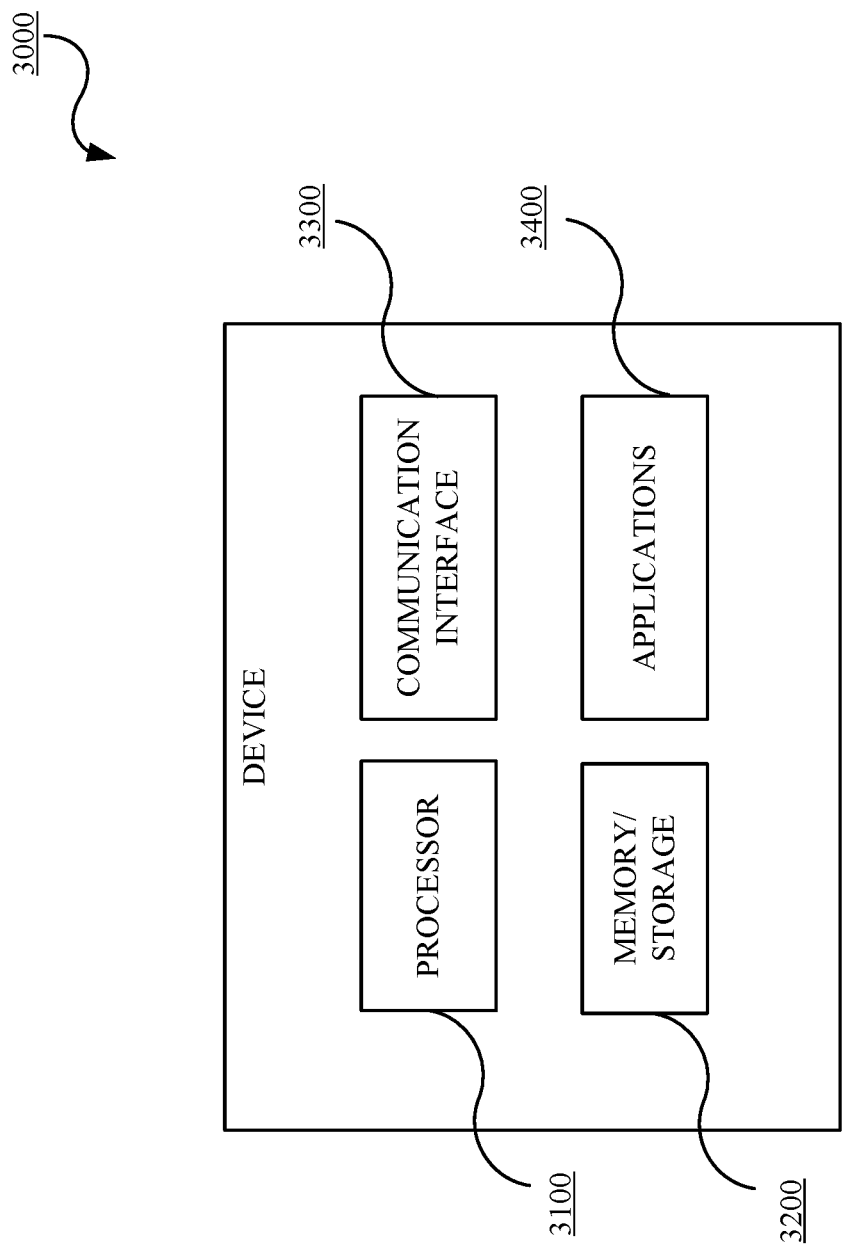
FIG. 3 is a block diagram of an example of a device in accordance with embodiments of this disclosure.

FIG. 3 is a block diagram of an example of a device 3000 in accordance with embodiments of this disclosure. The device 3000 may include, but is not limited to, a processor 3100, a memory/storage 3200, a communication interface 3300, and applications 3400. The device 3000 may include or implement, for example, the border relays 3200 including at least the border relays 1200, the border relay$_1$ 1210, the offload border relay$_1$ 1215, the border relay$_2$ 1220, the offload border relay$_2$ 1225, the CMTS 1400, the CPE$_1$, CPE$_2$, ..., CPE$_N$ 1500, the CPE$_1$, CPE$_2$, ..., CPE$_P$ 1600, and the CPE$_1$, CPE$_2$, ..., CPE$_R$ 1700, the dual border relay 2000, the hardware border relay 2010, and the offload border relay 2020. The applications can be, but not limited to, the software on the offload border relays and the like. In an implementation, appropriate memory/storage 3200 may store MAP-T rules, reports, and the like. In an implementation, appropriate memory/storage 3200 is encoded with instructions for at least controlling and managing the offloading methods and techniques described herein. The offloading techniques or methods described herein may be stored in appropriate memory/storage 3200 and executed by the appropriate processor 3100 in cooperation with the memory/storage 3200, the communications interface 3300, and applications 3400, as appropriate. The device 3000 may include other elements which may be desirable or necessary to implement the devices, systems, compositions and methods described herein. However, because such elements and steps are well known in the art, and because they do not facilitate a better understanding of the disclosed embodiments, a discussion of such elements and steps may not be provided herein.

Figure 4:
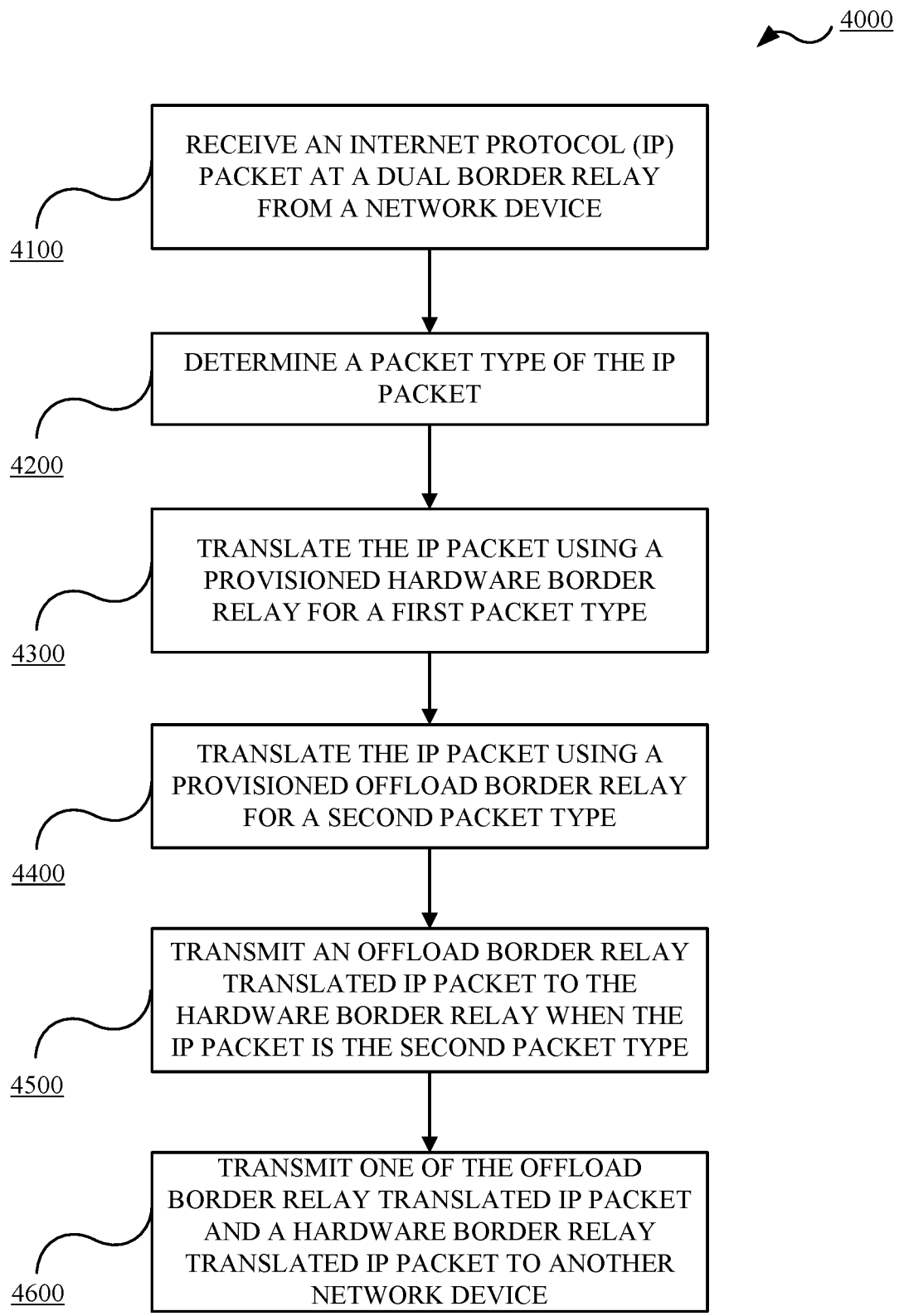
FIG. 4 is a flowchart of an example method for MAP-T accelerated and offload dual border relay in accordance with embodiments of this disclosure.

FIG. 4 is a flowchart of an example method 4000 for an accelerated and offload dual border relay processing in accordance with embodiments of this disclosure. The method 4000 includes: receiving 4100 an Internet Protocol (IP) packet at a dual border relay from a network device; determining 4200 a packet type of the IP packet; translating 4300 the IP packet using a IPv6 transition technology provisioned hardware border relay for a first packet type; translating 4400 the IP packet using a IPv6 transition technology provisioned offload border relay for a second packet type; transmitting 4500 an offload border relay translated IP packet to the hardware border relay when the IP packet is the second packet type; and transmitting 4600 one of the offload border relay translated IP packet and a hardware border relay translated IP packet to another network device. For example, the method 4000 may be implemented, as applicable and appropriate, by the border relays 1200, the border relay$_1$ 1210, the offload border relay$_1$ 1215, the border relay$_2$ 1220, the offload border relay$_2$ 1225, the CMTS 1400, the CPE$_1$, CPE$_2$, ..., CPE$_N$ 1500, the CPE$_1$, CPE$_2$, ..., CPE$_P$ 1600, and the CPE$_1$, CPE$_2$, ..., CPE$_R$ 1700, the dual border relay 2000, the hardware border relay 2010, the offload border relay 2020, the processor 3100, the memory/storage 3200, the communication interface 3300, and the applications 3400.

The method 4000 includes receiving 4100 an Internet Protocol (IP) packet at a dual border relay from a network device. The dual border relay receives packets in IPv4 and IPv6 formats which are then translated to the other format. The network device can be a router, gateway, CMTS, and the like.

The method 4000 includes determining 4200 a packet type of the IP packet. The IP packet can include defined fields which indicate the communications protocol being used, the presence of IP Options for translation techniques, the need for fragmentation, and/or that the packet is part of fragment stream. If the IP packet is TCP or UDP, has no IP Options for translation techniques, does not need fragmentation, and is not part of a fragment stream, then the IP packet is a first packet type. If the IP packet is not TCP and UDP, has IP Options for translation techniques, needs fragmentation, or is part of a fragment stream, then the IP packet is a second packet type. With respect to the encapsulation techniques, when de-capsulating the IPv4 packet from within the IPv6 header, no offloading is needed for the packet when the packet contains an IP option or is an ICMP packet. A packet with IP options does not require offloading when encapsulating IPv4 inside the IPv6 header, whereas the rest of the listed packet types are offloaded.

The method 4000 includes translating 4300 the IP packet using a IPv6 transition technology provisioned hardware border relay for a first packet type. The IP packet is translated pursuant to IPv6 transition technology rules provisioned on the hardware border relay. An IPv4 packet is translated to IPv6 and an IPv6 packet is translated to IPv4. Destination address, hop count, time-to-live, checksum processing, and other processing is handled by the hardware border relay.

The method 4000 includes translating 4400 the IP packet using a IPv6 transition technology provisioned offload border relay for a second packet type. The IP packet is translated pursuant to IPv6 transition technology rules provisioned on the offload border relay. An IPv4 packet is translated to IPv6 and an IPv6 packet is translated to IPv4. Destination address processing including destination MAC address processing is jointly handled by the hardware border relay and the offload border relay. The hardware border relay modifies the destination MAC address to the offload border relay. The offload border relay re-inserts the original MAC destination address. In implementations, the hardware border relay sends the original destination address including the destination MAC address to the offload border relay. The hop count, time-to-live processing, and checksum processing is handled by the offload border relay. The hardware border relay does not process hop count, time-to-live, and checksum processing when the IP packet is a second packet type. That is, no modifications are made to the hop count, time-to-live number, or checksum due to the transfer of the IP packet from the hardware border relay to the offload border relay.

The method 4000 includes transmitting 4500 an offload border relay translated IP packet to the hardware border relay when the IP packet is the second packet type. The offload border relay transmits the translated IP packet to the hardware border relay for eventual transmission out of the dual border relay.

The method 4000 includes transmitting 4600 one of the offload border relay translated IP packet and a hardware border relay translated IP packet to another network device. The hardware border relay transmits the relevant translated IP packet back to a core network via the another network device.

In general, a method for performing dual border relay processing includes receiving, by a hardware border relay from a network device, an Internet Protocol (IP) packet, determining, by the hardware border relay, a packet type of the IP packet, translating, by the hardware border relay provisioned with IPv6 transition technology rules, the IP packet to a hardware translated IP packet when the IP packet is a first packet type, translating, by the offload border relay provisioned with MAP-T rules, the IP packet to an offload translated IP packet when the IP packet is a second packet type, transmitting, by the offload border relay to the hardware border relay, the offload translated IP packet when the IP packet is the second packet type, and transmitting, by the hardware border relay, one of the offload translated IP packet and the hardware translated IP packet to another network device. In implementations, the determining reviews defined fields in the IP packet. In implementations, the defined fields are a communication protocol field, one or more fields indicative of fragmentation, one or more fields indicative of multiple fragments, and when the translating by the hardware border relay and the offload border relay is a translation technique an Internet Protocol (IP) options field. In implementations, the IP packet is the first packet type when the defined fields indicate that the IP packet is a transmission control protocol (TCP) packet or a user datagram protocol (UDP) packet, has no IP Options when the translating by the hardware border relay and the offload border relay is a translation technique, does not need fragmentation, and is not part of a fragment stream. In implementations, the IP packet is the second packet type when the defined fields indicate that the IP packet is at least one of not a TCP packet and not a UDP packet, has IP Options when the translating by the hardware border relay and the offload border relay is a translation technique, needs fragmentation, or is a part of a fragment stream. In implementations, the determining further includes modifying, by the hardware border relay, a destination media access control (MAC) address in the IP packet to the offload border relay when the IP packet is the second packet type. In implementations, the determining further includes foregoing, by the hardware border relay, modification of at least one of a hop count or a time-to-live when the IP packet is the second packet type. In implementations, the transmitting the offload translated IP packet further includes modifying, by the offload border relay, the destination MAC address to an original MAC destination address when the IP packet is the second packet type. In implementations, the transmitting the offload translated IP packet further includes modifying, by the offload border relay, the at least one of a hop count or a time-to-live when the IP packet is the second packet type. In implementations, the IP packet is one of an Internet Protocol Version 4 (IPv4) or an Internet Protocol Version 6 (IPv6) format.

In general, a dual border relay includes a software border relay provisioned with Mapping of Address and Port using translation (MAP-T) rules, and a hardware accelerator provisioned with MAP-T rules. The hardware accelerator configured to determine whether a received Internet Protocol (IP) packet is a first type or a second type, translate the IP packet when IP packet is the first type, offload the IP packet to the software border relay when IP packet is the first type, and transmit a translated IP packet to a network device, and the software border relay configured to translate the IP packet when IP packet is the second type, and transmit a software translated IP packet to the hardware accelerator for transmission to the network device as the translated IP packet. In implementations, the IP packet is the first type when IP packet fields in the IP packet indicate a transmission control protocol (TCP) packet or a user datagram protocol (UDP) packet, no IP Options, no fragmentation, and no fragment stream. In implementations, the IP packet is the second type when IP packet fields in the IP packet indicate at least one of not a transmission control protocol (TCP) packet and a user datagram protocol (UDP) packet, has IP Options, needs fragmentation, or is a fragment stream. In implementations, the hardware accelerator is further configured to replace a destination MAC address of the IP packet with a MAC address of the software border relay when the IP packet is the second type, and passing through at least one of a hop count or a time-to-live when the IP packet is the second type. In implementations, the software border relay is further configured to reinsert an original MAC destination address of the IP packet when the IP packet is the second type and modify at least one of a hop count or a time-to-live when the IP packet is the second type. In implementations, the software border relay is configured to support multiple hardware accelerators.

In general, a method for network address translation processing includes determining by a network device provisioned with network address translation rules a type for a received Internet Protocol (IP) packet, the network device including a hardware component and a software component, processing the IP packet with a first pathway for a first type, the first pathway including translating the IP packet using the hardware component, and transmitting the hardware component translated IP packet to a network device, and processing the IP packet with a second pathway for a second type, the second pathway including translating the IP packet using the software component, transmitting the software component translated IP packet to the hardware component, and transmitting the software component translated IP packet by the hardware component to the network device. In implementations, the method further includes changing a destination MAC address in the IP packet to the software component when the IP packet is the second type, and staying modification of at least one of a hop count or a time-to-live when the IP packet is the second type. In implementations, the second pathway further includes modifying the destination MAC address to an original MAC destination address when the IP packet is the second type, and modifying the at least one of a hop count or a time-to-live when the IP packet is the second type. In implementations, the IP packet is the second type when the defined fields indicate that the IP packet is at least one of not a TCP packet and not a UDP packet, has IP Options when the translating by the hardware component and the software component is a translation technique, needs fragmentation, or is a part of a fragment stream.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for performing dual border relay processing, the method comprising:
   receiving, by a hardware border relay from a Cable Modem Termination System (CMTS), an Internet Protocol (IP) packet, wherein the hardware border relay comprises an input determination circuit, a processing circuit provisioned with IPv6 transition technology rules, and an output circuit;
   determining, by the input determination circuit, a packet type of the IP packet;
   transmitting, by the input determination circuit, the IP packet to the processing circuit when the IP packet is a first packet type;

transmitting, by the input determination circuit, the IP packet to an offload border relay provisioned with MAP-T rules when the IP packet is a second packet type;

translating, by the processing circuit, the IP packet to a hardware translated IP packet when the IP packet is the first packet type;

transmitting, by the processing circuit, the hardware translated IP packet to the output circuit of the hardware border relay;

translating, by the offload border relay, the IP packet to an offload translated IP packet when the IP packet is the second packet type;

transmitting, by the offload border relay to the output circuit of the hardware border relay, the offload translated IP packet when the IP packet is the second packet type; and transmitting, by the output circuit of the hardware border relay, one of the offload translated IP packet and the hardware translated IP packet to a network device.

2. The method of claim 1, wherein the determining reviews defined fields in the IP packet.

3. The method of claim 2, wherein the defined fields are a communication protocol field, one or more fields indicative of fragmentation, one or more fields indicative of multiple fragments, and when the translating by the hardware border relay and the offload border relay is a translation technique an Internet Protocol (IP) options field.

4. The method of claim 3, wherein the IP packet is the first packet type when the defined fields indicate that the IP packet is a transmission control protocol (TCP) packet or a user datagram protocol (UDP) packet, has no IP Options when the translating by the hardware border relay and the offload border relay is a translation technique, does not need fragmentation, and is not part of a fragment stream.

5. The method of claim 3, wherein the IP packet is the second packet type when the defined fields indicate that the IP packet is at least one of not a TCP packet and not a UDP packet, has IP Options when the translating by the hardware border relay and the offload border relay is a translation technique, needs fragmentation, or is a part of a fragment stream.

6. The method of claim 1, wherein the determining further comprising:
modifying, by the input determination circuit of the hardware border relay, a destination media access control (MAC) address in the IP packet to the offload border relay when the IP packet is the second packet type.

7. The method of claim 6, wherein the determining further comprising:
foregoing, by the input determination circuit of the hardware border relay, modification of at least one of a hop count or a time-to-live when the IP packet is the second packet type.

8. The method of claim 7, wherein the transmitting the offload translated IP packet further comprising:
modifying, by the offload border relay, the destination MAC address to an original MAC destination address when the IP packet is the second packet type.

9. The method of claim 8, wherein the transmitting the offload translated IP packet further comprising:
modifying, by the offload border relay, the at least one of a hop count or a time-to-live when the IP packet is the second packet type.

10. The method of claim 9, wherein the IP packet is one of an Internet Protocol Version 4 (IPv4) or an Internet Protocol Version 6 (Ipv6) format.

11. A dual border relay comprising:
a software border relay provisioned with Mapping of Address and Port using translation (MAP-T) rules; and
a hardware accelerator provisioned with MAP-T rules,
the hardware accelerator configured to:
determine whether an Internet Protocol (IP) packet received from a Cable Modem Termination System (CMTS) is a first type or a second type;
translate the IP packet when IP packet is the first type;
offload the IP packet to the software border relay when IP packet is the second type; and
transmit a translated IP packet to a network device; and
the software border relay configured to:
translate the IP packet when IP packet is the second type; and
transmit a software translated IP packet to the hardware accelerator for transmission to the network device as the translated IP packet.

12. The dual border relay of claim 11, wherein the IP packet is the first type when IP packet fields in the IP packet indicate a transmission control protocol (TCP) packet or a user datagram protocol (UDP) packet, no IP Options, no fragmentation, and no fragment stream.

13. The dual border relay of claim 11, wherein the IP packet is the second type when IP packet fields in the IP packet indicate at least one of not a transmission control protocol (TCP) packet and a user datagram protocol (UDP) packet, has IP Options, needs fragmentation, or is a fragment stream.

14. The dual border relay of claim 11, wherein the hardware accelerator is further configured to:
replace a destination MAC address of the IP packet with a MAC address of the software border relay when the IP packet is the second type; and
passing through at least one of a hop count or a time-to-live when the IP packet is the second type.

15. The dual border relay of claim 14, wherein the software border relay is further configured to:
reinsert an original MAC destination address of the IP packet when the IP packet is the second type; and
modify at least one of a hop count or a time-to-live when the IP packet is the second type.

16. The dual border relay of claim 11, wherein the software border relay is configured to support multiple hardware accelerators.

17. A method for network address translation processing, the method comprising:
determining by a network device provisioned with network address translation rules a type for an Internet Protocol (IP) packet received from a Cable Modem Termination System (CMTS), the network device including a hardware component and offload software component;
processing the IP packet with a first pathway for a first type, the first pathway including:
translating the IP packet using the hardware component; and
transmitting the hardware component translated IP packet to another network device; and
processing the IP packet with a second pathway for a second type, the second pathway including:
translating the IP packet using the offload software component;

transmitting the offload software component translated IP packet to the hardware component; and transmitting the offload software component translated IP packet by the hardware component to the another network device.

18. The method of claim 17, the method further comprising:

changing a destination MAC address in the IP packet to the offload software component when the IP packet is the second type; and staying modification of at least one of a hop count or a time-to-live when the IP packet is the second type.

19. The method of claim 17, the second pathway further including:

modifying the destination MAC address to an original MAC destination address when the IP packet is the second type; and modifying the at least one of a hop count or a time-to-live when the IP packet is the second type.

20. The method of claim 19, wherein the IP packet is the second type when the defined fields indicate that the IP packet is at least one of not a TCP packet and not a UDP packet, has IP Options when the translating by the hardware component and the offload software component is a translation technique, needs fragmentation, or is a part of a fragment stream.

* * * * *